(12) United States Patent
Johnsen

(10) Patent No.: US 7,300,068 B1
(45) Date of Patent: Nov. 27, 2007

(54) TRAILER COUPLER INTEGRAL KEYED LOCK

(76) Inventor: Roger L. Johnsen, P. O. Box 16138, Galveston, TX (US) 77552

( * ) Notice: Subject to any disclaimer, the term of this patent is extended or adjusted under 35 U.S.C. 154(b) by 485 days.

(21) Appl. No.: 11/065,606

(22) Filed: Feb. 25, 2005

(51) Int. Cl.
*B60D 1/60* (2006.01)
(52) U.S. Cl. .................. 280/507; 280/511; 70/258
(58) Field of Classification Search .......... 280/507, 280/513, 511; 70/58, 258, 14, 19, 57, 166–169, 70/232, 237
See application file for complete search history.

(56) References Cited

U.S. PATENT DOCUMENTS 3,514,980 A * 6/1970 Doyle ................... 70/258
4,209,184 A * 6/1980 Byers .................. 280/511
6,270,107 B1 * 8/2001 Stoughton ............ 280/507
6,481,740 B1 * 11/2002 Haase et al. .......... 280/511
6,505,849 B1 * 1/2003 Ebey .................... 280/513

* cited by examiner

*Primary Examiner*—George B. Nguyen
*Assistant Examiner*—Michael Stabley
(74) *Attorney, Agent, or Firm*—Albert O. Cota

(57) ABSTRACT

An integral keyed lock (10) for a trailer trigger-lock coupler for use as an aftermarket kit or to be incorporated by an original equipment manufacturer. The coupler integral keyed lock (10) utilizes an actuating lever (20) that is configured to interface with and enclose a lock (52). The lock (52) is preferably keyed and includes an outward-extending plunger (54). The lock is disposed within the actuating lever, inside an enlarged portion (26) of one end. The plunger of the lock extends when actuated with a key and prevents rotational travel of the coupler trigger latch, thereby locking the trailer coupler until the plunger is retracted with the key.

12 Claims, 3 Drawing Sheets

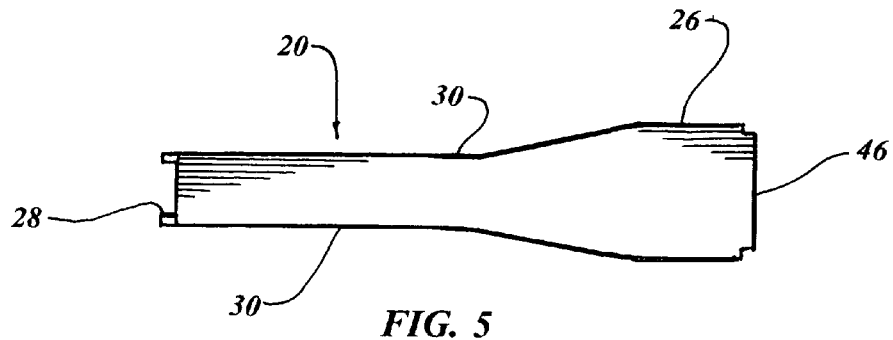
FIG. 5
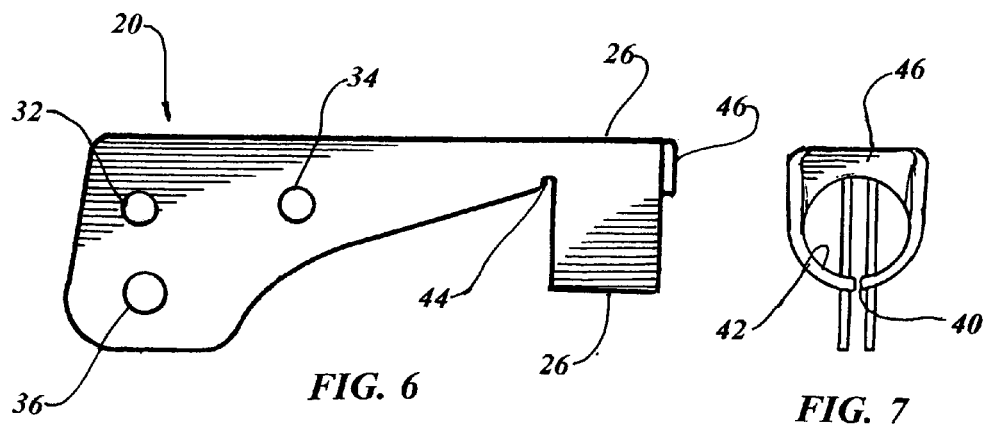
FIG. 6
FIG. 7
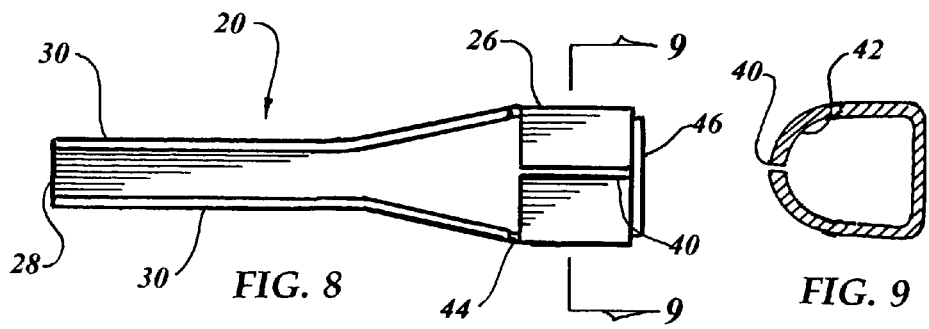
FIG. 8
FIG. 9
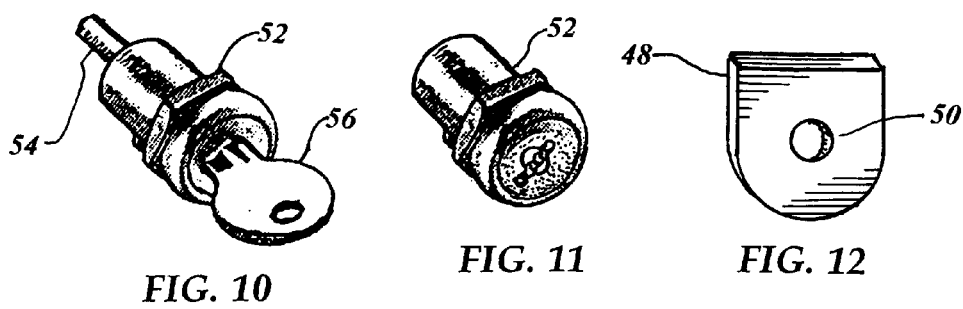
FIG. 10
FIG. 11
FIG. 12

TRAILER COUPLER INTEGRAL KEYED LOCK

TECHNICAL FIELD

The invention generally pertains to trailer couplers, and more specifically to a trigger-lock coupler with an improved actuating lever that incorporates a lock which prevents travel of the coupler latch, thereby maintaining the coupler in a locked position.

BACKGROUND ART

Previously, many types of separate locking devices and integral locking mechanisms have been used in endeavoring to provide an effective means for securing a trailer coupler that is attached to a motor vehicle.

The prior art listed below did not disclose any patents that possess the novelty of the instant invention, however the following U.S. patents are considered related:

| U.S. Pat. No. | Inventor | Issue Date |
| --- | --- | --- |
| 4,776,607 | Richter et al. | Oct. 11, 1988 |
| 5,205,666 | Hollis | Apr. 27, 1993 |
| 6,000,710 | Schocker et al. | Dec. 14, 1999 |
| 6,352,279 | Ebey | Mar. 5, 2002 |
| 6,505,849 | Ebey | Jan. 14, 2003 |
| 6,588,790 | Hall | Jul. 8, 2003 |

Richter et al. in U.S. Pat. No. 4,776,607 teaches a coupler for a ball type hitch with a coupler body that includes a socket portion and a closure mechanism that moves from an open to a closed position. The closure mechanism includes a retaining plate and latch plate, with a spring for biasing. The retaining plate includes a lock receiving aperture for receiving a lock that prevents unauthorized opening of the coupler.

U.S. Pat. No. 5,205,666 issued to Hollis is for a trailer coupler having a housing with a pair of jaws that lock around a hitch ball. A jaw locking ball with a finger tab facilitates operation. A closure compression spring is located inward at one horizontally-pivoted ear extension for biasing the ball towards the jaw-locking position.

Schocker et al in U.S. Pat. No. 6,000,710 discloses a trailer coupler lock with the locking assembly mounted within a housing coupler, thus preventing withdrawal of the hitch ball from the housing. The lock includes a rotatable pin that extends transversely thorough the coupling housing to prevent withdrawal. The pin is connected to a lever that is positioned externally of the coupler housing outwardly causing a spring to bias the lever to the locked position.

Ebey in U.S. Pat. No. 6,352,279 teaches a ball clamp trailer coupler that is tightened by rotating a clamp to engage a hitch ball within the coupler socket.

U.S. Pat. No. 6,505,849 issued to Ebey is a so-called trigger lock-type trailer coupler to which the patent improvement is directed. The coupler contains a trigger latch and an actuator arm, thereby allowing the improvement to be utilized by replacing the actuator arm with an advanced arm. The advanced arm contains a keyed lock which prevents the trigger latch from rotating completely, thereby locking the coupler in place.

Hall in U.S. Pat. No. 6,588,790 discloses a remotely actuated coupler for automatically locking a trailer to a towing vehicle ball. The automatic locking mechanism is powered by a battery that is actuated by remote control. The locking mechanism also provides a manual release handle.

DISCLOSURE OF THE INVENTION

There are many trigger-lock type trailer couplers in use which are very popular with the public particularly for single tongue trailers. This type of coupler is quick to use, economical, and safely latches a trailer to a hitch ball of a motor vehicle. In most cases, the coupler includes a padlock hole for security, however there are drawbacks to this type of securement, since a padlock must be purchased separately, and must be removed and replaced each time the hitch is disconnected or stored. For local hauling the padlock may not be required, but when a trailer is parked within view of the public a lock is preferably used to preclude theft or unauthorized removal of the trailer.

Therefore, the primary object of the invention is to improve a trailer coupler with an integral lock that is built into the coupler's trigger latch actuating lever, instead of requiring the purchase and storing of a padlock.

An important object of the invention is that the improvement may be incorporated into the design by the original equipment manufacturer by changing only the actuating lever, which is redesigned to include an enlarged portion that houses a keyed lock.

Another object of the invention is that the actuating lever which houses the keyed lock may be furnished as a kit that easily retrofits almost any existing trigger-type coupler. The kit furnishes all of the necessary equipment, which is consists of the actuating lever and a pair of rivets, which may be easily removed by drilling and replaced by bucking with a common punch and a hammer.

Still another object of the invention is the ability to furnish different types of locks according to the basic security required, which vary in cost according to the degree of the security required.

Yet another object of the invention is the simplicity of design, which requires standard machinery and simple tooling to form the actuating lever and enclose the lock.

A further object of the invention is directed to the cost of the improvement, which is well within the reach of many, as the actuating lever is easily fabricated and the lock benefits from the economy of numbers.

These and other objects and advantages of the invention will become apparent from the subsequent detailed description of the preferred embodiment and the appended claims taken in conjunction with the accompanying drawings.

BRIEF DESCRIPTION OF THE DRAWINGS

FIG. 5 is a top view of the preferred embodiment of the actuating lever shown removed from the invention for clarity.

FIG. 6 is a right view of the preferred embodiment of the actuating lever shown removed from the invention for clarity.

FIG. 7 is an end view of the preferred embodiment of the actuating lever shown removed from the invention for clarity.

FIG. 8 is a bottom view of the preferred embodiment of the actuating lever shown removed from the invention for clarity.

FIG. 9 is a cross-sectional view taken along lines 9-9 of FIG. 8.

FIG. 10 is a partial isometric view of a typical keyed lock in the locked position.

FIG. 11 is a partial isometric view of a typical keyed lock in the unlocked position.

FIG. 12 is a partial isometric view of the lock retainer plate removed from the invention for clarity.

BEST MODE FOR CARRYING OUT THE INVENTION

Figure 1:
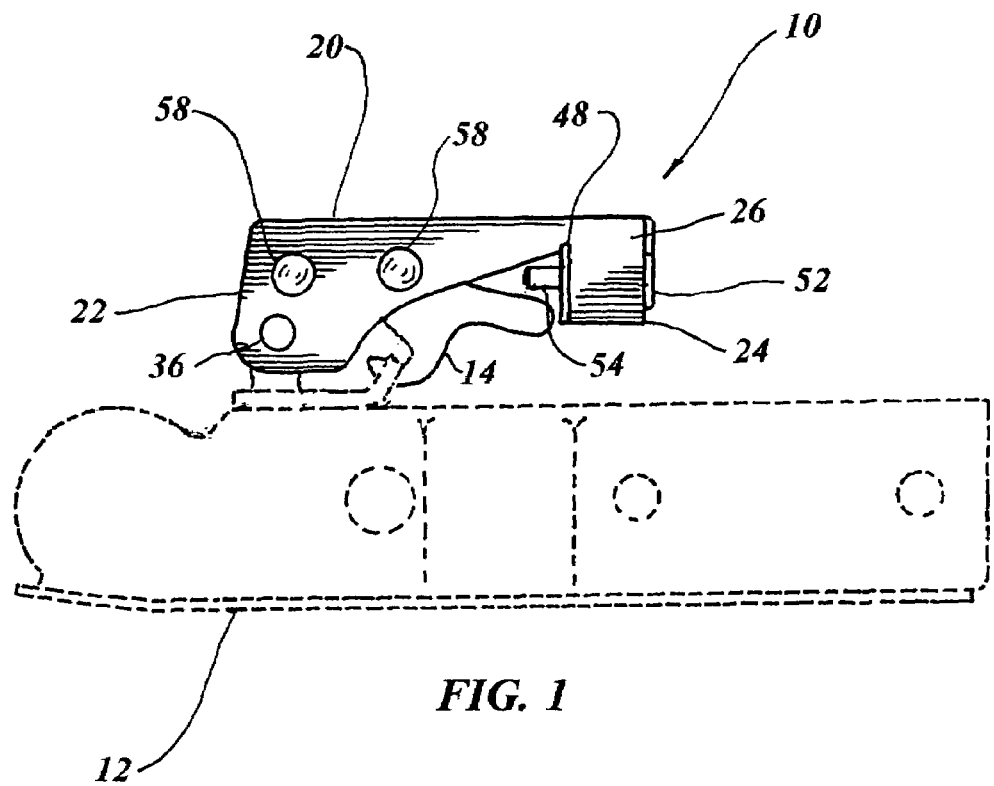
FIG. 1 is a right side view of the trailer coupler's integral keyed lock in the preferred embodiment illustrated in the locked position.
Figure 2:
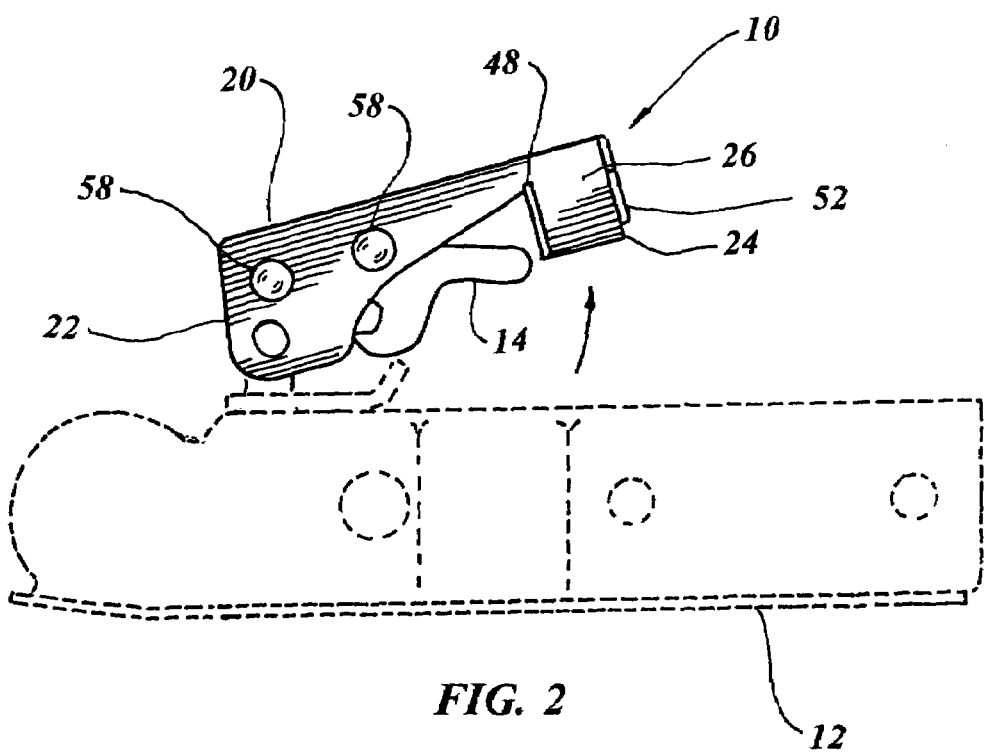
FIG. 2 is a right side view of the trailer coupler's integral keyed lock in the preferred embodiment illustrated in the unlocked position.
Figure 3:
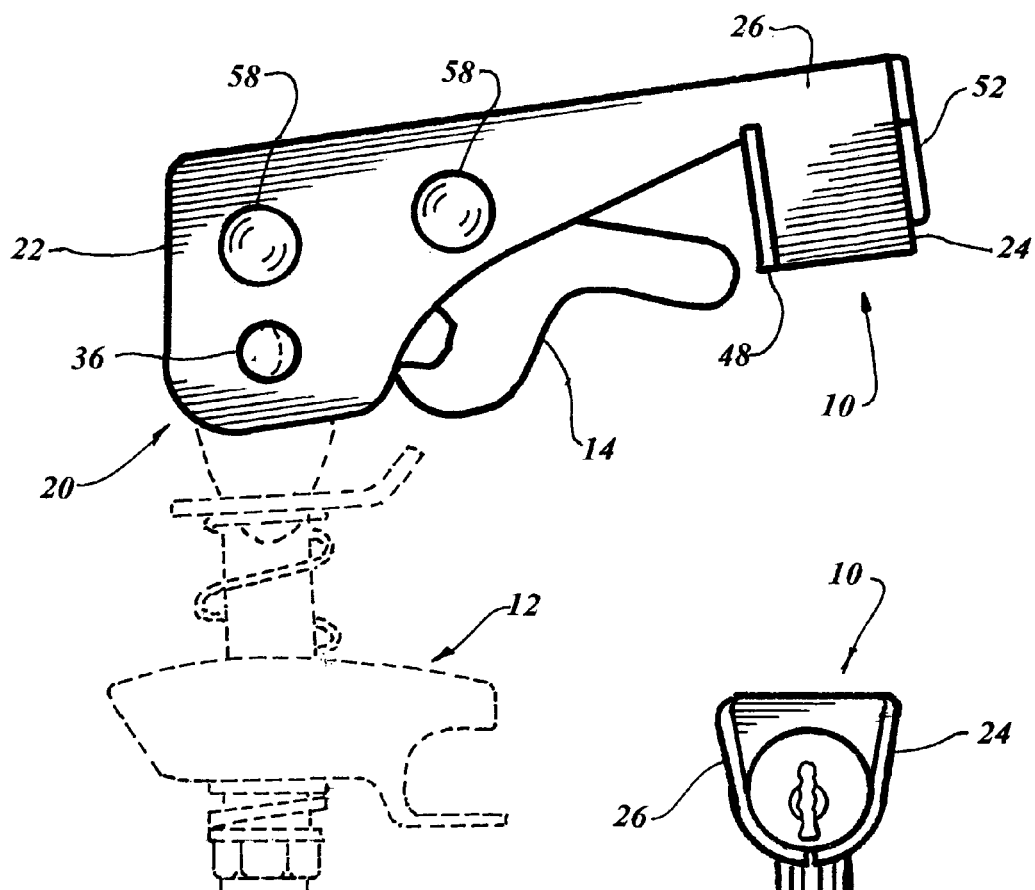
FIG. 3 is a right side view of the actuating lever in the preferred embodiment with ancillary elements attached.
Figure 4:
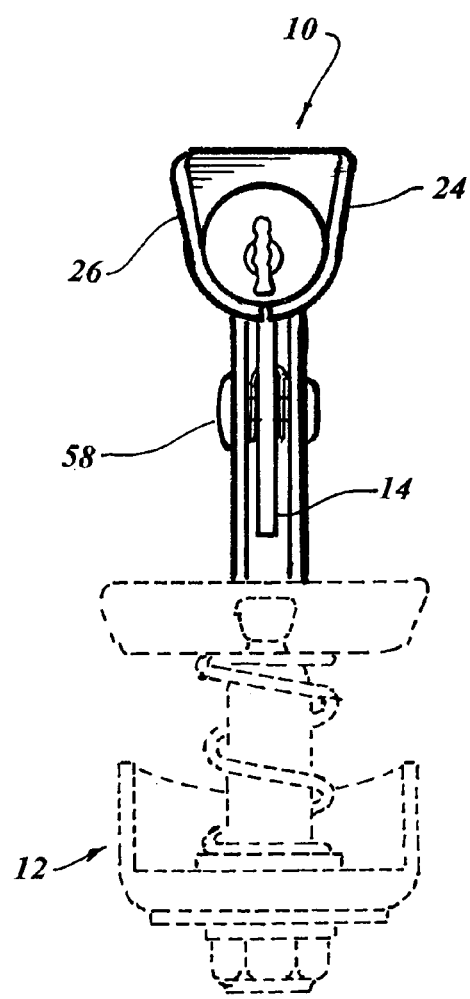
FIG. 4 is a front view of the actuating lever in the preferred embodiment with ancillary elements attached.

The best mode for carrying out the invention is presented in terms of a preferred embodiment for an integral keyed lock 10 for a trailer coupler 12 assembly, as shown in FIGS. 1 through 12. The invention is an improvement of an existing trailer coupler assembly 12, and can be utilized an either as an aftermarket product or a replacement of an existing prior art actuating lever by an original equipment manufacturer. The trailer coupling 12 however must formerly incorporate a coupler trigger latch 14, which is known in the industry as a trigger-lock type trailer coupling.

The improvement consists of a replacement actuating lever 20 having a first end 22 and a second end 24, with the second end 24 including an enlarged end portion 26 that is configured to interface with and enclose a lock. The actuating lever 20 has a U-shape 28, with parallel sides 30 that flare out on the second end 24 to form the enlarged end portion 26, with the enlarged end portion incorporating the parallel tapered sides 30. The first end 22 of the actuating lever 20 includes lever pivot apertures 32, trigger latch pivot apertures 34 and lever padlock apertures 36. All the apertures 32,34,36 extend through both sides of the lever 20 for attachment purposes and operational utility of the existing trailer coupling assembly 12.

The replacement actuating lever 20 is formed from a single sheet of material that is cut and punched in the flat and formed into the U-shape. The single sheet of material is preferably steel, and has a thickness of from 0.090 to 0.100 inches (0.229 to 0.254 centimeters).

The actuating lever enlarged end portion 26, as shown in FIGS. 1-8, is formed with an opposed pair of integral downward-depending arms 38, that are located on each parallel side 30 and are bent radially to intersect at a bottom interface 40, thereby forming a partial circular cavity 42 configured to receive a keyed lock. The actuating lever 20 includes a pair of opposed mating notches 44, that are located forward of said enlarged end portion 26, as shown in FIGS. 6 and 8. The second end 24 of the lever 20, as shown best in FIGS. 6-9, has a bent-over rear flange 46. The rear flange 46 is configured to correspond to the keyway end of a lock for retaining the lock within the cavity 42 of the enlarged end portion 26 of the actuating lever 20.

A lock retainer plate 48, as shown alone in FIG. 12, is disposed within the opposed mating notches 44 that are located forward of said actuating lever enlarged end portion 26 for enclosing the back end of a keyed lock. The lock retainer plate 48 has a centrally located bore 50 that permits the lock to function as a stop. The lock's preclude movement of the coupler trigger latch with the bore 50, thus permitting penetration of a lock integral plunger. The entire actuating lever 20 is plated with a metallic coating for corrosion protection.

A keyed lock 52 is disposed within the actuating lever enlarged end portion 26, as shown in FIGS. 1-4, and includes a plunger 54 that protrudes out from the keyed lock 52 when actuated with a key 56. The action of blocking and preventing travel of the coupler trigger latch 14, as shown in FIG. 1, locks the trailer coupling assembly 12. The assembly 12 remains locked until the plunger 54 is retracted by rotating the key 56, thereby permitting the trigger latch 14 to be manually actuated, which releases the attachment mechanism of the trailer coupler.

Many different types of locks may be utilized in the invention with equal ease and incorporate the same function, however a keyed tumbler type lock 52 with a removable separate key 56, as shown in FIGS. 10 and 11 is preferred. A keyed tumbler type lock 52 with a double bitted key 56, or a high security disc tumbler type lock 52 with a round key 56 is also a viable selection. While a lock with an outward-extending plunger 54 is preferred, a rotating pawl may also be incorporated into the invention with only slight alterations in the design. The pawl can rotate into the normal operational radial path of the trigger latch 14, thus accomplishing the same functional utility.

The structure of the partial circular cavity 42 is formed by the downward-depending arms 38 and the lock retaining plate 46 on the first end 22 along with the bent-over rear flange 46 configured to correspond to the keyway end of the key lock 52. It is possible to simplify this attachment method by welding the lock in place for security.

Since a number of conventional trigger-lock trailer couplers are fabricated by various manufacturers, the improvement by the addition of the keyed lock 52 to the actuating lever 20 may be incorporated into the design of each original equipment manufacturer.

If the invention is produced as an aftermarket device that replaces the existing actuating lever, the lever can be removed by drilling out two existing rivets 58, holding the lever in place, and removing and replacing the existing coupler trigger latch 14 along with its torsion spring onto the new actuating lever 20 with new rivets that may be easily bucked in place in the field.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. An integral lock for a trailer coupler that incorporates a coupler trigger latch, which comprises:
   a) an actuating lever having provisions to enclose a lock, and
   b) a lock that is disposed within said actuating lever for preventing travel of the coupler trigger latch, thus firmly maintaining the trailer coupler in a locked position.

2. An integral keyed lock for a trailer coupler that incorporates a coupler trigger latch, which comprises:
   a) an actuating lever having a first end and a second end, with the second end having an enlarged end portion that is configured to interface with and enclose a lock, and
   b) a keyed lock having an outward-extending plunger therein, with said lock disposed within said actuating lever enlarged end portion, the plunger extending when actuated with a key, thus preventing travel of the coupler trigger latch and locking the trailer coupler until the plunger is retracted with the key.

3. The integral keyed lock as recited in claim 2 wherein said actuating lever further having a U-shape with parallel sides that flare out to form the enlarged end portion, with the enlarged end portion having parallel tapered sides, and wherein the first end having parallel sides with lever pivot apertures therethrough also trigger latch pivot apertures therethrough and lever padlock apertures therethrough for attachment and operational utility of the trailer coupling.

4. The integral keyed lock as recited in claim 2 wherein said actuating lever is formed from a single sheet of material.

5. The integral keyed lock as recited in claim 4 wherein said actuating lever that is formed from a single sheet of material further comprises a steel sheet having a thickness of from 0.090 to 0.100 inches (0.229 to 0.254 centimeters).

6. The integral keyed lock as recited in claim 2 wherein said actuating lever enlarged end portion further comprises integral downward-depending arms on each parallel side that are formed radially to essentially intersect at a bottom interface, thereby forming a partial circular cavity that is configured to receive a keyed lock, and wherein said actuating lever having a pair of opposed mating notches which are located forward of said enlarged end portion, and said second end having a bent over rear flange that is configured to correspond to a keyed lock for retaining the lock within the cavity of the enlarged end portion of the actuating lever.

7. The integral keyed lock as recited in claim 6 further comprising a lock retainer plate that is disposed within said opposed mating notches which are located forward of said actuating lever enlarged end portion for maintaining the keyed lock.

8. The integral keyed lock as recited in claim 2 wherein said actuating lever is plated with a metallic coating for corrosion protection.

9. The integral keyed lock as recited in claim 2 wherein said keyed lock further comprises a keyed, tumbler type lock with a removable key.

10. The integral keyed lock as recited in claim 2 wherein said keyed lock further comprises a keyed, tumbler type lock with a double bitted key.

11. The integral keyed lock as recited in claim 2 wherein said keyed lock further comprises high security, disc tumbler type lock with a round key.

12. The integral keyed lock as recited in claim 2 wherein said keyed lock is welded in place for security.

* * * * *